United States Patent
Wang et al.

[19]

[11] Patent Number: 5,836,620
[45] Date of Patent: Nov. 17, 1998

[54] TELESCOPIC EXTENSION WAND FOR VACUUM CLEANER

[75] Inventors: Chieh-Chun Wang; Chia-Ming Lin, both of Taichung, Taiwan

[73] Assignee: Kinergy Industrial Co., Ltd., Taichung, Taiwan

[21] Appl. No.: 711,590

[22] Filed: Sep. 10, 1996

[51] Int. Cl.⁶ .............................. A47L 9/24; F16L 27/12
[52] U.S. Cl. ............................................. 285/7; 285/302
[58] Field of Search ............................. 285/7, 303, 302, 285/314; 248/354.1, 354.5, 354.6

[56] References Cited

U.S. PATENT DOCUMENTS

| | | | |
|---|---|---|---|
| 2,963,930 | 12/1960 | Clothier et al. | 285/303 X |
| 3,083,041 | 3/1963 | Owenmark | 285/302 X |
| 3,351,359 | 11/1967 | Ferraris | 285/7 |
| 3,589,757 | 6/1971 | Mooney | 248/354.1 X |

FOREIGN PATENT DOCUMENTS

| | | | |
|---|---|---|---|
| 520675 | 7/1955 | Belgium | 248/354.6 |
| 839608 | 6/1958 | United Kingdom | 285/302 |

*Primary Examiner*—John A. Ricci

[57] ABSTRACT

A telescopic extension wand of a vacuum cleaner includes an inclined tab provided at the inner wall of a sleeve for biasing a retaining plate having retaining teeth underside to engage with a plurality of retaining teeth of a middle tube or an inner tube so the middle or inner tube can be relatively positioned. A projected boss provided at the inner wall of the sleeve can be guided by a guiding slot disposed at an outer wall of the external tube or middle tube. When the sleeve is rotated to a preset position, the inclined tab as well as the retaining plate can be controlled to engage or disengage the middle tube or inner tube with/without engagement between the retaining teeth therebetween. By this arrangement the middle tube and inner tube can be repositioned.

3 Claims, 4 Drawing Sheets

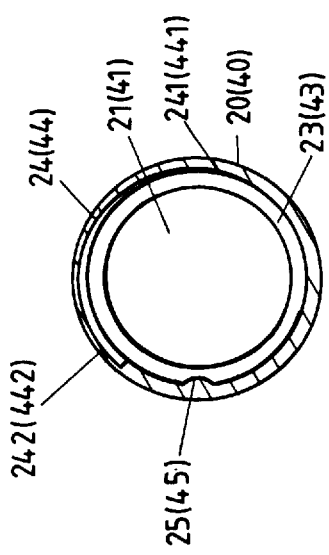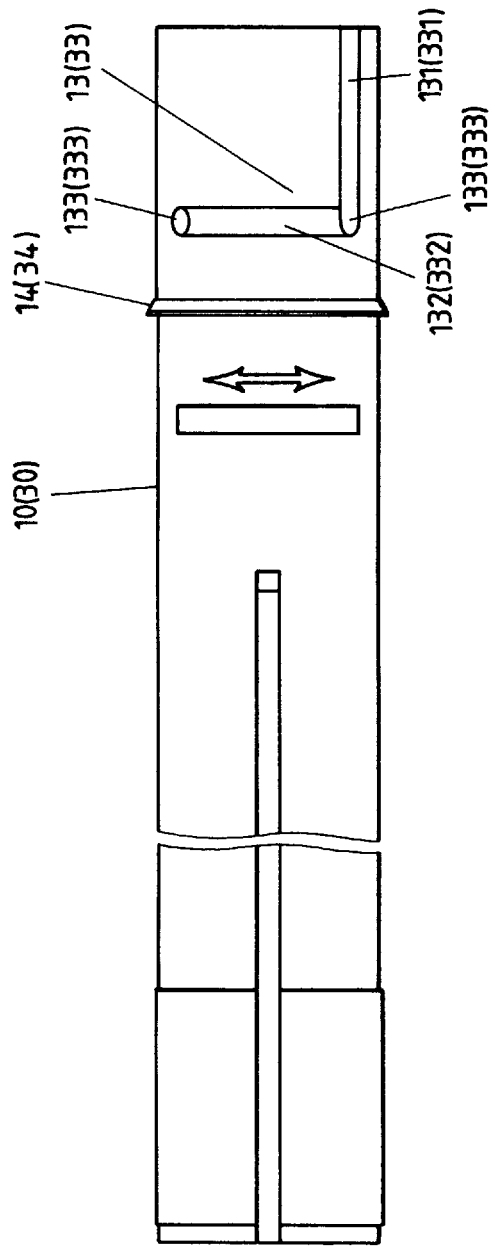

TELESCOPIC EXTENSION WAND FOR VACUUM CLEANER

BACKGROUND OF THE INVENTION

1. Field of the Invention

The present invention relates to a vacuum cleaner and, more particularly to an improvement to the telescopic extension wand of a vacuum cleaner wherein said extension wand is capable of quick connection and operation. The breakage of said extension wand can also be advantageously avoided.

2. Description of the Prior Art

As shown in FIG. 1, the conventional telescopic extension wand of a vacuum cleaner generally comprises a first tube 70 and a second tube 71 having external threads 72,73 to be engaged with the inner threads 76,77 of the first and second connectors 74,75. Then the stopping tapers 78,79 together with the inner disposed clipping rings 80 are engaged by the first and second connectors 74 and 75. The inner second tube 81 and said primary tube 70 can thus be locked or released.

In use, when the telescopic extension wand is to be extended or shortened, the first and second connectors 74,75 are released in such a manner that the clipping rings 80 will not be engaged by said stopping tapers 78,79. Accordingly, said first tube 70 and said second inner tube 81 are moveable with respect to each other. When a desired length is reached, said first and second connectors 74,75 are locked again in such a manner that the stopping tapers 78,79 are engaged against said clipping rings 80. Thus, the face of said first tube 70 or said inner second tube 81 corresponding to said clipping ring 80 is retained by said clipping ring 80. As a result, no relative movement can be realized therebetween.

Though the conventional telescopic extension wand may achieve its predetermined goal, it has the following disadvantages.

1. The engagement between the primary tube 70 and the inner secondary tube 81 can be referred to as a frictional interference fit. Since elements of the extension wand are mostly made from plastic material, after a period of service, the inner diameter of the stopping taper becomes larger from continuously exerted force and frictional wear. In light of this, the user must lock the first and second connectors 74,75 increasingly tighter. When the resulting deformation exceeds the limit of the parts, the locking capability is lost and the extension wand is unusable.

2. Since the engagement is through the interference fit between the clipping ring and the primary tube or the secondary tube, a structural breakage can occur from overload or structural defects.

3. The extending or shortening of the length of the extension wand consumes considerable time in locking or releasing the connectors.

SUMMARY OF THE INVENTION

It is the object of this invention to provide an improvement to an extension wand wherein the conventional disadvantages can be advantageously solved.

According to one aspect of this invention, an inner inclined tab is disposed at an inner wall of a sleeve to bias a retaining plate disposed thereunder and having retaining teeth underside to engage with a plurality of retaining teeth of a middle tube or inner tube. Accordingly, the middle or inner tube can be readily and conveniently positioned.

According to another aspect of the present invention, the mechanical breakage resulting from overload and wearing can be advantageously avoided.

BRIEF DESCRIPTION OF THE DRAWINGS

FIG. 4 is a plan view of the external tube or middle tube viewed from another direction;

FIG. 5 is a cross-sectional view taken from the line 5—5 in FIG. 2;

DETAILED DESCRIPTION OF THE PREFERRED EMBODIMENT

Figure 1:
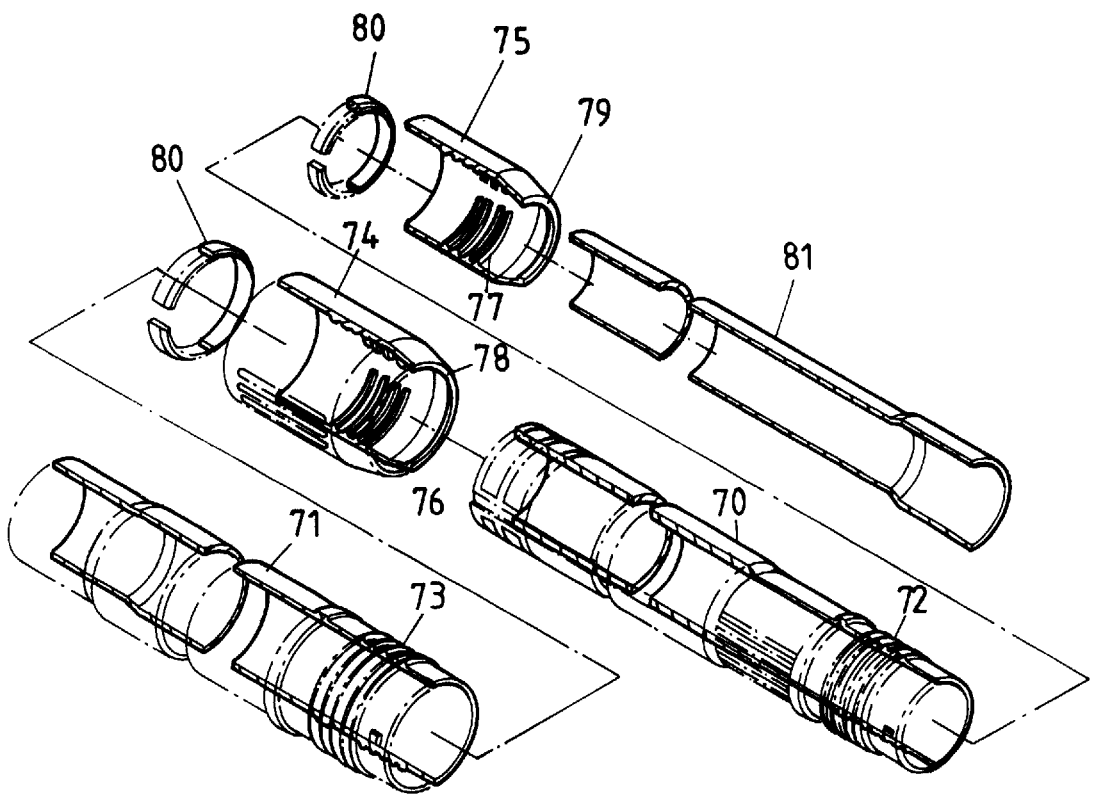
FIG. 1 is an exploded perspective view of a conventional telescopic extension wand.
Figure 2:
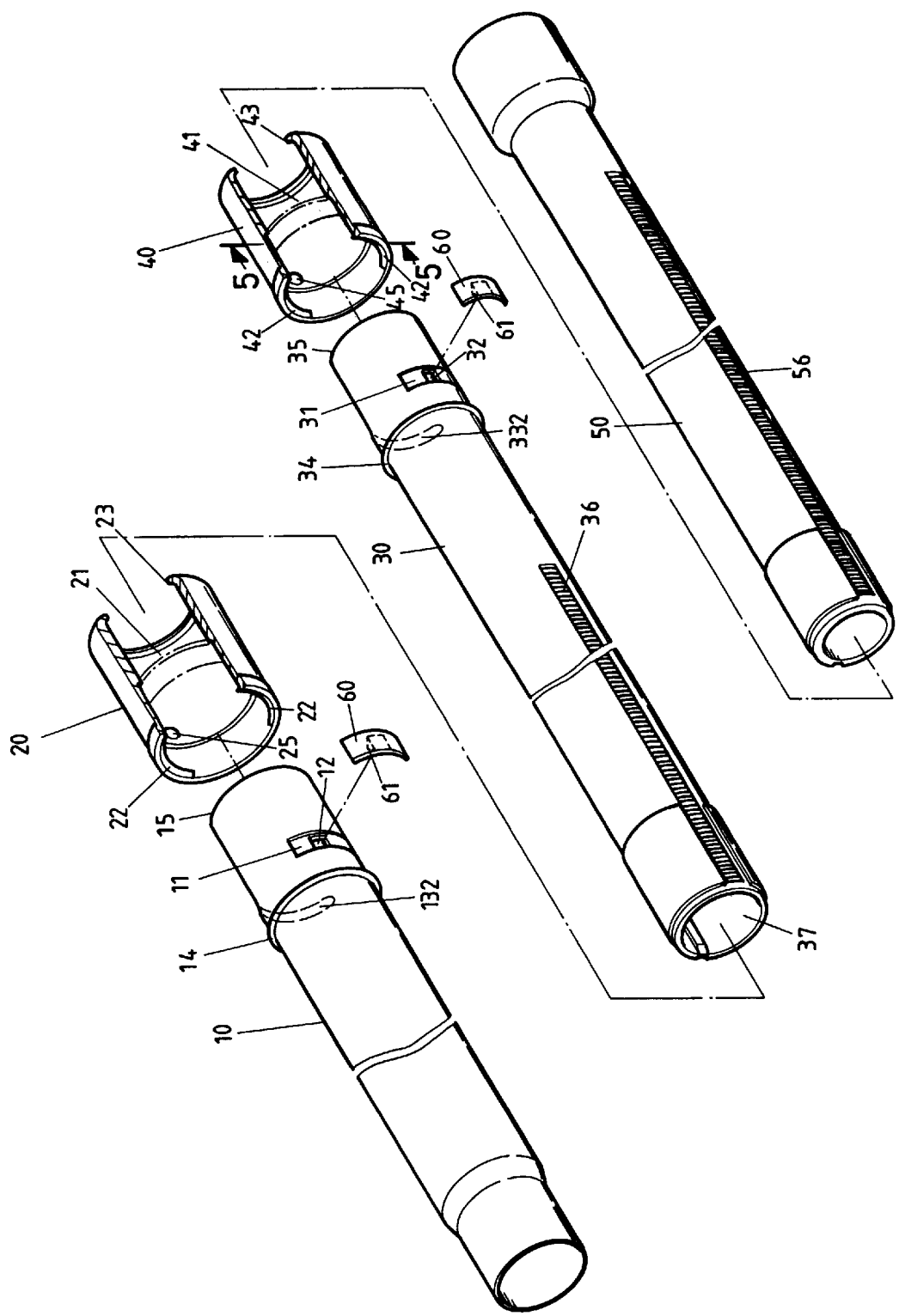
FIG. 2 is an exploded perspective view of the telescopic extension wand according to this invention.
Figure 3:
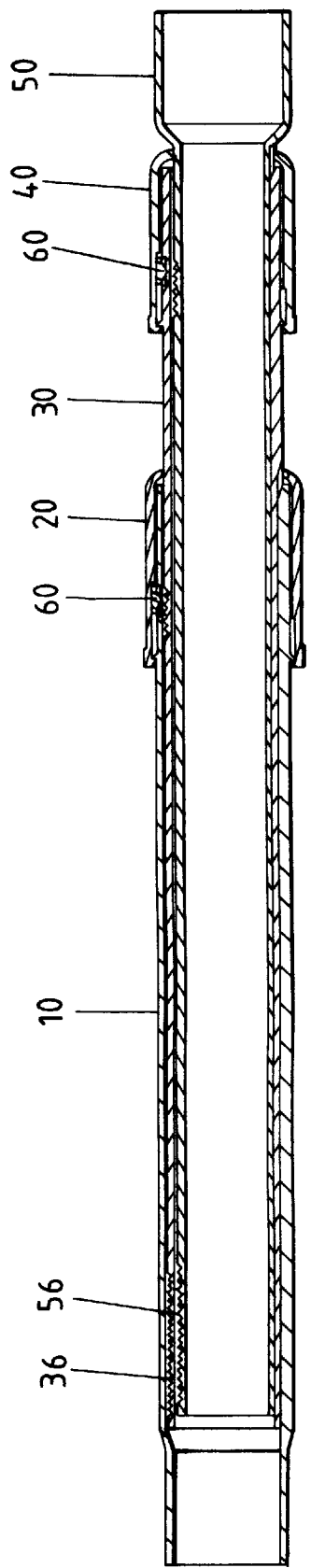
FIG. 3 is a cross-sectional view of the telescopic extension wand according to this invention.

Referring to FIGS. 2 and 3, the telescopic extension wand according to this invention generally comprises an external tube 10, a first sleeve 20, a middle tube 30, a second sleeve 40, and an inner tube 50. Each of the outer walls of said external tube 10 and said middle tube 30 is provided with an elongate slot 11,31 having a rectangular opening 12,32 therein. A retaining plate 60 having a plurality of retaining teeth 61 is disposed within said rectangular opening 12,32. Said retaining teeth 61 may project over said rectangular openings 12,32. On the other hand, in the position opposite to said elongate slot 11,31, an L-shaped guiding slot 13,33 is provided, as shown in FIG. 4. A retaining ring 14,34 is provided at a suitable position.

The first sleeve 20 and the second sleeve 40 are engaged on the front portion of said external tube 10 and middle tube 30 according to their dimensions. Each of said first sleeve 20 and said second sleeve 40 is provided with a first stopping ring 22,42 in the rear portion of the inner hole 21,41 and a second stopping ring 23,43 at each front portion. Said first stopping ring 22,32 may engage with the retaining rings 14,34 of said external tube 10 and said middle tube 30, and said second stopping ring 23,43 may press against the edges 15,35 of said external tube 10 and said middle tube 30. Accordingly, said first sleeve 20 and said second sleeve 40 may be positioned with respect to said external tube 10 and said middle tube 30, respectively. In this configuration, no axial movement is allowed and only rotational movement can be allowed. An inclined tab 24,44 is disposed at first sleeve 20 and second sleeve 40 in the position corresponding to said retaining plate 60. A projected boss 25,45 is also provided with respect to said guiding slot 13,33, as shown in FIG. 5.

In the position of said middle tube 30 and said inner tube 50, with respect to said retaining teeth 61 of said retaining plate 60, a plurality of teeth 36,56 are provided.

In assembling, said first sleeve 20 and said second sleeve 40 are engaged to the front portion of said external tube 10 and said middle tube 30, respectively, then the middle tube 30 is inserted into the inner hole 16 of said external tube 10, and finally said inner tube 50 is inserted into the inner hole 37 of said middle tube 30. The assembling is thus completed.

The function of said guiding slots 13,33 of said external tube 10 and said middle tube 30 is to permit said projected bosses 25,45 to be inserted therein through traverse slots 131,331. On the other hand, the longitudinal slots 132,332 have a deeper gradient at ends 133,333. By this arrangement, when said first and second sleeves 20,40 are rotated, said projected bosses 25,45 are rotated along said longitudinal slots 132,332 to opposite ends 133,333 and can be positioned thereat.

Figure 6:
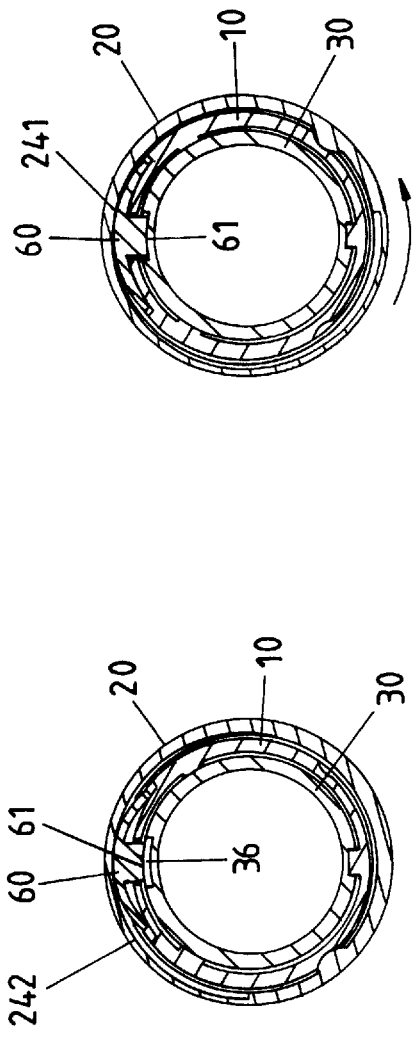
FIG. 6 is a cross-sectional view showing the tubes in a locked relationship.
Figure 7:
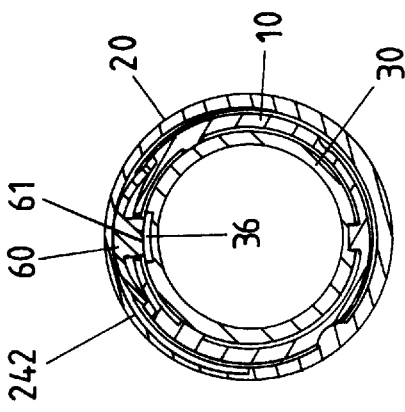
FIG. 7 is another cross-sectional view showing the tubes in a locked relationship.

Referring to FIGS. 5, 6 and 7, since the first and second sleeves 20,40 have the same configuration as well as operation, only one sleeve, said first sleeve 20 with said middle tube 30 is described. Since the height of both ends of said inclined tab 24 is different, when said first sleeve 20 is rotated to permit the higher end 241 to engage with said retaining plate 60, a pressing force is exerted on said retaining plate 60 by said higher end 241. Meanwhile, said retaining teeth 61 of said retaining plate 60 are pressed in contact with said retaining teeth 36 of said middle tube 30 through said rectangular opening 12 of said external tube 10 and said inner hole 16, as shown in FIG. 6. By this arrangement, said external tube 10 is positioned with respect to said middle tube 30.

On the contrary, when the lower end 242 of said inclined tab 24 is pressed against said retaining plate 60, said retaining plate 60 may be released in such a manner that the retaining teeth 61 and 36 are separated from each other by the restoring force of said retaining plate 60, as shown in FIG. 7. Accordingly, the user may adjust a desired length by moving said middle tube 30 with respect to said external tube 10. When the desired length is reached, said first sleeve 60 can be rotated again to permit said higher end 241 to engage with said retaining plate 61 again, so said external tube 10 and said middle tube 30 can be repositioned relative to each other.

By the provision of the present invention, the user can readily adjust the length of said middle tube 30 and said inner tube 50 by rotating said first and second sleeves 20,40. Since the engagement between the retaining teeth 61 and 36(56) is not a frictional interference fit, the wearing and breakage of said middle tube 30 and said inner tube 50 can be completely avoided.

From the foregoing description, the telescopic extension wand of a vacuum cleaner may achieve its objects with the subject matter disclosed herein. While a particular embodiment of the present invention has been illustrated and described, it shall be obvious to those skilled in the art that various other changes and modifications can be made without departing from the spirit and scope of the invention. It is therefore intended to cover in the appended claims all such changes and modifications that are within the scope of the present invention.

We claim:

1. A telescopic extension wand for a vacuum cleaner comprising:

a) an outer tube including an outer wall provided with a pair of retaining rings, an L-shaped guide slot and an elongate slot, an opening formed in the elongate slot, a retaining plate received within the elongate slot and having a plurality of first retaining teeth disposable through the opening;

b) an inner tube telescopically received within the outer tube, the inner tube including an outer wall provided with a series of second retaining teeth, the first and second retaining teeth being complementary to and selectively engageable with each other for securing the inner tube in a telescopically extended position relative to the outer tube; and c) a sleeve received over the outer tube, the sleeve including a pair of stopping rings engaged with the retaining rings of the outer tube for limiting the sleeve to only rotational movement with respect to the outer tube, an inclined tab engaging the retaining plate and urging same inwardly to engage the first retaining teeth with the second retaining teeth in one rotational position of the sleeve and disengaging the first retaining teeth from the second retaining teeth in a second rotational position of the sleeve, and a projecting boss disposed within the L-shaped slot for sliding movement therein during rotation of the sleeve.

2. The telescopic extension wand of claim 1 wherein the L-shaped guide slot further includes a gradient formed therein, the gradient being engageable by the projecting boss of the sleeve for positioning the sleeve relative to the outer tube.

3. The telescopic extension wand of claim 1 wherein the inclined tab of the sleeve includes two ends of different heights.

* * * * *